United States Patent Office 3,546,178
Patented Dec. 8, 1970

3,546,178
PREPARATION OF LINEAR POLY(ESTER-AMIDES)
John R. Caldwell and Russell Gilkey, Kingsport, Tenn., assignors to Eastman Kodak Company, Rochester, N.Y., a corporation of New Jersey
No Drawing. Continuation-in-part of application Ser. No. 445,745, Apr. 5, 1965. This application Dec. 23, 1968, Ser. No. 786,457
Int. Cl. C08g 20/02
U.S. Cl. 260—75
15 Claims

ABSTRACT OF THE DISCLOSURE

A process for preparing linear poly(ester-amides), said process comprising heating compounds containing carboxylic acid groups, amino groups, and hydroxy groups as the sole reactive groups (for example, dicarboxylic acids, diamines, diols, amino acids, amino alcohols, and hydroxy acids) in the presence of a catalyst which is a tin compound (for example, dibutyl tin oxide, dibutyl tin dilaurate, and tin tetrabutoxide).

---

This application is a continuation-in-part of Caldwell and Gilkey U.S. Ser. No. 445,745, filed Apr. 5, 1965 now abandoned.

This invention relates to a novel process for the production of a new class of linear poly(ester-amides) from aromatic amino compounds (such as aromatic diamines and amino alcohols, that is, compounds in which the amino groups are attached directly to an aromatic ring system), carboxylic acid compounds (such as dicarboxylic acids, amino acids, and hydroxy acids), and glycols (such as polymethylene glycols of 2–10 carbon atoms). More particularly, the invention relates to the preparation from such reactants of high molecular weight, long chain, linear poly(ester-amides) of high inherent viscosity, high melting point, and other physical properties which particularly fit them for use in the production of fibers, films, sheets and other shaped plastic products.

From the earlier work of Carothers on nylon it is known that if one reacts a dibasic acid, such as adipic, with a diamine, such as hexamethylenediamine, a polyamide is formed and water is split out. The equation for the reaction is as follows:

$$\text{HOOC}-\text{C}_4\text{H}_8-\text{COOH} + \text{H}_2\text{N}-\text{C}_6\text{H}_{12}-\text{NH}_2 \xrightarrow{270^\circ \text{ C.}}$$

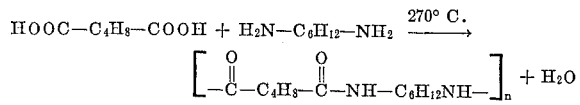

A plurality of polyamide repeat units of the above equation are formed by connecting the carboxyl portion of one unit with the amine portion of another unit and so on until the desired molecular weight is attained. It is also known that polyamides may be prepared by reacting various aromatic diamines with various free dicarboxylic acids or esters of such dicarboxylic acids at temperatures up to 300° C. or higher in the presence of a catalyst. For example, U.S. Pat. 2,244,192 to Flory describes the use of phosphoric and/or sulfuric acids as catalysts. It has been found that these acid catalysts do not give polymers suitable for practical use because of the fact that side reactions occur and linear high molecular weight polymers are not obtained.

The use of litharge (PbO) has also been suggested for this purpose in U.S. Pat. 2,669,556. While this compound has a slight activity as a catalyst for the above-mentioned reaction between aromatic diamines and free dicarboxylic acids or esters thereof, the reaction rate is extremely slow and undesirably colored products are obtained on long heating. As pointed out in this disclosure, if no catalyst is employed, one obtains low molecular weight polymers in a total reaction time of two or three hours and on prolonged heating cross-linked polymers are obtained which are difficult or impossible to process because of non-uniform melt flow. As will be more fully set forth hereinafter the particular catalysts employed in the present invention have been found to be much more effective than litharge or other lead compounds.

It has also been established in the art to which the present invention relates that aromatic diamines are much less reactive toward dicarboxylic acids than aliphatic diamines. So far as we are aware no process has been described in the patent or technical literature for the production of useful poly(ester-amides) in a reasonable length of time, say, a total reaction time of one to three hours, by reacting aromatic amino compounds with carboxylic acid compounds and hydroxy compounds. Furthermore, in order to have practical utility as a fiber, sheet or film-forming material or as a plastic product, a poly(ester-amide) must have little or no color, it must have a linear structure (that is no cross-linked structure should be present in the molecule), and it must have an inherent viscosity of the order of 0.3 or higher.

The term inherent viscosity of various polymers as used herein may be defined as a measure of the degree of polymerization of a polymeric compound and is calculated from the equation:

$$\eta = \frac{\ln \eta_r}{C}$$

wherein $\eta_r$ is the ratio of the viscosity of a dilute (approximately .25 percent by weight) solution of the polymer in a solvent composed of 60 percent by weight of phenol and 40 percent by weight of tetrachloroethane to the viscosity of the solvent itself, and C is the concentration of the polymer in grams per 100 cubic centimeters of the solution.

The determination of inherent viscosity as described above uses a mixture of phenol and tetrachloroethane as the solvent for the polymer. In some cases, the poly(ester-amide) will not be soluble in this particular solvent. For instance, it may be necessary to use concentrated sulfuric acid or dimethylformamide containing about 5 to 8 percent lithium chloride, calcium nitrate or some other salt. Regardless of the solvent used, the calculation of the inherent viscosity is carried out as described above. It is to be understood that when the term "inherent viscosity" is used, it is implied that an appropriate solvent was employed for the particular poly(ester-amide) under discussion.

The production of certain fiber-forming poly(ester-amides) is known. For example, in Drewitt U.S. Pat. 2,547,113 there is disclosed a special process by which poly(ester-amides) may be produced from dicarboxylic acids, glycols, and aromatic diamines. In this process the glycols and acid components must first be reacted to form a prepolymer after which reaction with the diamine is accomplished. It is specifically pointed out in lines 20–28 of column 2 of this patent that a heterogeneous product totally unsuitable for formation of fibers, films, and related products would be obtained if the acid, glycol, and diamine are initially combined. For example, the patentee states, "Using the older method of mixing all the constituents at the beginning and heating up, we obtained a soft heterogeneous mass which appeared to contain some solid material and which on further heating only melted with decomposition and from which fibers could not be drawn. The same applies to forming a polymer from benzidine, decane-diol and sebacic acid." Not only does this disclosure indicate that fiber-forming poly(ester-amides) cannot be made by initially polymerizing, in one step, a mixture of acid, glycol, and aromatic diamine, but the reaction time required to obtain the desired product is exceedingly long, as for example, 17 hours in the single example of the patent. No mention is made of any type of catalyst for the reaction. Contrasted to such a process, as will be more fully set forth hereinafter, the process of the present invention involves adding all of the reactants at one time and carrying out the reaction in a single stage and in the presence of a catalyst which markedly reduces the reaction time, as for example to less than 3 hours.

Another disclosure of the production of poly(ester-amides) is that of U.S. Pat. to Brubaker 2,224,037 which describes a noncatalytic process of reacting a mixture of dicarboxylic acid, diamine and glycol, thereby obtaining a poly(ester-amide) in which the polyester portion of the poly(ester-amide) must be present in an amount of at least 67 mole percent. As contrasted to the process of the invention to be described hereinafter, reaction times are exceedingly long, for example, of the order of 20 hours or more. Furthermore, as will be set forth in the examples below, the process is not susceptible of producing high molecular weight polymers if aromatic diamines are employed under the conditions disclosed in this patent.

U.S. Pat. 2,048,778 to Brubaker also discloses the production of poly(ester-amides) but does not contain any reference to the employment of any type of catalyst. The poly,(ester-amides) produced in such a process, in contrast to those of the instant invention, because of their low melting points and low molecular weight, would be unsuitable for the manufacture of fibers, films, sheets, and related products.

The present invention has an object to provide a novel and highly efficient process for the production of high molecular weight, long chain, linear poly(ester-amides) of high inherent viscosities, melting points, and other physical properties which fit them for use in the production of fibers, films, sheets, and other shaped plastic products.

A further object is to provide a new and improved catalytic process for the manufacture of high molecular weight, linear, fiber- and film-forming poly(ester-amides) from aromatic amino compounds, carboxylic acid compounds, and aliphatic hydroxy compounds.

Another object is to provide an improved process for the production of such poly(ester-amides) involving the use of a novel catalyst which materially shortens the time of reaction between the required aromatic amino compounds, carboxylic acid compounds, and glycols to produce high molecular weight, linear poly(ester-amides) of the desired inherent viscosity, melting point, and other properties as compared to the time required to obtain similar poly(ester-amide) polymers by known methods.

A further object is to provide novel poly(ester-amides) from aromatic amino compounds, carboxylic acid compounds and aliphatic hydroxy compounds, which poly (ester-amides) will have high inherent viscosities, high melting points, and other physical properties which fit them for use in the production of fibers, films, sheets, and other shaped plastic objects.

A still further object is to provide novel poly(ester-amides) from aromatic diamines, dicarboxylic acids and glycols, which poly(ester-amides) will have high inherent viscosities, high melting points and other physical properties which fit them for use in the production of fibers, films, sheets, and molded and other shaped plastic objects.

Other objects will appear hereinafter.

These objects are accomplished by the following invention which, in its broader aspects, comprises heating at a temperature within the range of 200–350° C. in the presence of from about 0.005 percent to about 2.0 percent, based on the weight of the reactants, of a tin compound as catalyst, a reaction mixture consisting of difunctional organic compounds containing carboxyl groups, aliphatic or alicyclic hydroxyl groups, and aromatic primary amino groups and in which the carboxyl groups are present in an amount equivalent to the sum of the hydroxyl groups and the aromatic amino groups. Such a reaction mixture may consist of two or more reactants, the only condition being that the compounds are, in accordance with the invention, selected on the basis that they contain the above specified combination of carboxyl groups, aliphatic or alicyclic hydroxyl groups, and aromatic amino groups. Thus, the reaction mixture may contain two reactants such as an aromatic amino acid and an aliphatic or alicyclic hydroxy acid. The aromatic amino acid may, for example, be a compound such as p-aminophenyl acetic acid. The hydroxy acid may be a compound such hydroxymethylcyclohexane carboxylic acid or 3-hydroxycyclohexyl acetic acid. Another example of a suitable reaction mixture containing two reactants is one containing an aromatic amino alcohol such as p-aminobenzyl alcohol and a polymethylene dicarboxylic acid of 6–12 carbon atoms, such as adipic, sebacic, suberic, or azelaic acids. Another example of a suitable reaction mixture containing two reactants is one containing an aromatic amino alcohol such as p-aminobenzyl alcohol and an aromatic amino acid such as p-aminophenyl acetic acid. In like manner, reaction mixtures containing three or more reactants may be employed, a typical example of which is a mixture containing an aromatic diamine such as 4,4′-methylene dianiline, a dicarboxylic acid such as suberic acid, and an aliphatic or alicyclic glycol such as cyclohexanedimethanol or 1,3-cyclohexane diol. Another example of a suitable reaction mixture containing three reactants is one containing an aromatic diamine such as 4,4′-methylene dianiline, an aromatic amino alcohol such as p-aminobenzyl alcohol, and an aromatic amino acid such as p-aminophenyl acetic acid.

The tin catalyst may be an organo-metallic tin compound, that is, it contains at least one organic carbon to tin bond. The tin may be divalent or tetravalent. The carbon atom participating in the bond can be present in an alkyl or aryl group. The organo-metallic tin compound may have one or more valences satisfied by an electronegative radical such as oxygen, sulfur, carboxylate, alkoxide, sulfoxylate, hydroxide, halogen, etc. It will be understood that the term "electronegative radical" refers to any element or radical which bears a negative charge. The organo-metallic tin compound may have one or more valences satisfied by another substituted tin radical such as an alkyl tin. The organo metallic tin compounds referred to above which have been found to be effective as catalysts in our process are those described in Caldwell U.S. Pat. 2,720,507. An additional disclosure of such organo metallic tin compounds and methods of preparation is to be found in Encyclopedia of Chemical Technology, 2nd Supplement Volume, by R. E. Kirk and D. F. Othmer, (1960), pp. 523–548, published by Interscience Encyclopedia, Inc., New York, N.Y.

Another useful class of catalysts is represented by tin dialkoxides and tetraalkoxides. These compounds are described fully in U.S. Pat. 2,720,507. Other useful catalysts are tin compounds in which all of the valences are satisfied by carboxylate groups.

Of the above described tin compounds those which are soluble in the polymerizing reaction mixture and derivable from either di- or tetra-valent tin, such as those tin compounds which are the carboxylic acid salts, alkyl and aryl derivatives and compounds of tin containing both organic and inorganic radicals attached to tin and exemplified by such compounds as dibutyl diphenyl tin, tetraphenyl tin, dibutyl tin diacetate, tin octanoate, tin salicylate, dibutyl tin dibutoxide, dibutyl tin oxide, bis(tributyl tin) oxide, dibutyl tin dilaurate, triphenyl tin hydroxide, stannous oxalate, diethyl tin dibenzoate, trihexyl tin adipate, tin tetrabutoxide, dibutyl tin dichloride, and the like are especially valuable. We have found that these tin compounds, when used as catalysts for reaction between difunctional organic compounds of the type referred to above and containing carboxyl groups, aliphatic or alicyclic hydroxy groups, and aromatic amino groups, are unique in their ability to accelerate the reaction to produce high molecular weight, long chain, linear poly-(ester-amides) of high inherent viscosity and excellent color in reasonably short periods of time, since they promote, not only polyamidification but also polyesterification.

As to the dicarboxylic acids which may be used in accordance with our invention, any dicarboxylic acid such as those commonly employed in the art for the production of linear polyesters and polyamides may be employed. Such acids are characterized by certain structural features. For example, the aliphatic dicarboxylic acids should contain at least 4 carbon atoms between the carboxyl groups. The aromatic acids contain at least 3 carbon atoms between the carboxyl groups. A wide range of alicyclic acids can be used provided that they contain at least 3 carbon atoms between the carboxyl groups.

Typical aliphatic dicarboxylic acids may be represented by the structural formula $HOOC(CH_2)_nCOOH$ wherein $n$ is 4 to 18. Branched chain acids may also be used such as 2- and 3-methyladipic, 2-ethyladipic, trimethyladipic, dimethyladipic, 3-ethylsebacic, 3-butylsuberic, and 3-cyclohexylsebacic.

Typical aromatic dicarboxylic acids are isophthalic, 4-methylisophthalic, 5-tert-butylisophthalic, terephthalic, 2-methyl terephthalic, the isomeric naphthalendicarboxylic acids, etc. The carboxyl groups may be on different aromatic nuclei that are joined by a direct bond or by a divalent radical such as:

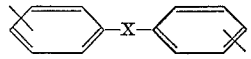

where X is a direct bond, —$CH_2$—, —$(CH_2)2$—, —$CH(CH_3)$—, —$CH(C_2H_5)$—, —$C(CH_3)_2$—, —O—, —O—$CH_2$—, —O—$(CH_2)_2$—O—, —O—$(CH_2)_4$—O—, —S—, or —$SO_2$—.

Suitable alicyclic dicarboxy acids include 1,4-cyclohexanedicarboxylic acid, 2,5-norcamphanedicarboxylic acid, 4,4'-dodecahydrodiphenic acid, 1,3-cyclopentanedicarboxylic acid, and pinic acid.

Other types of alicyclic acids include structures such as:

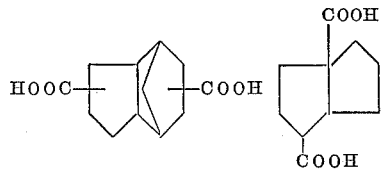

and

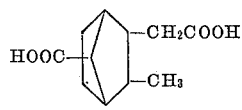

Dicarboxylic acids containing one or more ether groups can be employed, such as p-phenylenedioxydiacetic acid and similar compounds described in Makromolecular Chem., 32, 1 (1959).

Mixtures of two or more dicarboxylic acids can be used as, for example, a mixture of isophathalic and terephthalic acids. In particular, mixtures of an aliphatic acid with an aromatic acid are of value. Examples of useful combintions of this type are a mixture of isophathalic acid and adipic acid and a mixture of sebacic acid and terephthalic acid. Mixtures of an aromatic acid with an alicyclic acid or an aliphatic acid with an alicyclic acid also are of value in practicing the invention.

As to the aromatic diamines which can be employed in our invention, in general any aromatic diamine which contains at least 3 carbon atoms between the amino groups can be used. Typical examples of suitable diamines are m-phenylenediamine, p-phenylenediamine, 2,4-diamino- toluene, isomeric diaminoxylene, etc. Napahthalenediamines are also useful. Likewise, compounds such as benzidine, 4,4-methylenedianiline, and 3,4'-diaminodiphenyl can be employed. Other useful diamino compounds are listed in Belgian Pats. 565,266–8; British Pat. 871,580; and U.S. Pat. 3,006,899.

The aromatic diamines may contain one or more substituents on the aromatic ring. These substituents may be selected from the classes consisting of halogen such as chlorine and bromine; straight and branched chain alkyl radicals containing from one to 12 carbon atoms; aryl radicals containing from 6–10 carbon atoms; and alkylene aryl radicals and alkylated arylene radicals.

It should be here emphsized that the term "aromatic diamine" as used herein and in the appended claims signifies a compound in which the amino groups are attached directly to an aromatic ring system.

Aromatic amino acids that contain an amino group on an aromatic ring structure can be used. The carboxyl group of such acids may be attached to the aromatic ring or it may be separated from the aromatic ring by an alkylene group, a cycloalkylene group, or an alkyleneoxy group. If the carboxyl group and the amino group are present on the same aromatic ring, they should preferably be in m- or p-position with respect to each other, as the o-amino acids tend to be less stable. The aromatic nucleus may be derived from benzene or a condensed polycyclic aromatic system such as naphthalene, phenanthrene, etc. The aromatic ring may contain substituents such as lower alkyl, phenyl, and halogen. A particularly useful class of aromatic amino acids has the general structure:

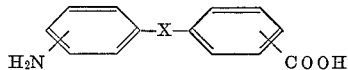

X has structure given above.

Suitable aromatic amino acids are represented by the following: m- and p-aminobenzoic acid, 3-amino-4-methylbenzoic acid, 3-amino-5-chlorobenzoic acid, (4-aminophenoxy)acetic acid, (3-aminophenoxy)acetic acid, 3-(4-aminophenyl)propionic acid, 4'-amino-3-carboxydiphenyl ether, 4'-amino-4-carboxydiphenyl, 4-(4-aminophenoxy) butyric acid, and 4'-carboxy-4-aminodiphenylmethane.

Aromatic amino acids that contain the naphthalene nucleus are represented by: 1-carboxy-3-aminonaphthalene, 2-carboxy-6-aminonaphthalene, 2-carboxy-7-aminonaphthalene, and (5-amino-1-naphthyloxy)acetic acid.

Aromatic amino alcohols in which the amino group is attached directly to an aromatic ring structure and the hydroxy group is sepaarted from the aromatic ring by an alkylene, a cycloalkylene, or an alkyleneoxy group can be used in the process of our invention. The aromatic nucleus may be derived from benzene or a condensed polycyclic aromatic system such as naphthalene, phenanthrene, etc. The aromatic ring may contain substituents such as lower alkyl groups, aryl groups, or a halogen. A particularly useful class of aromatic amino alcohol has the general structure:

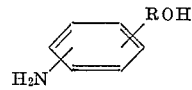

in which R is a straight- or branched-chain alkylene radical containing from 1 to 12 carbon atoms, a 5- or 6-membered alicyclic hydrocarbon radical, a cycloalkylene radical such as cyclohexanedimethylene, or an alkyleneoxy radical such as oxyethylene or oxypropylene.

Suitable representative aromatic amino alcohols are:

2(m-aminophenyl)ethanol,
2(p-aminophenoxy)ethanol,
3(4-methyl-3-aminophenyl)cyclohexanol,
2(m-aminophenoxyethoxy)ethanol,
4(p-aminophenylmethylene)cyclohexanemethanol,
6-amino-2-hydroxyethyl naphthalene, and
4(p-aminophenylmethylene)benzyl alcohol.

Dihydroxy compounds which may be employed in our invention are those in which the hydroxy groups are attached to separate carbon atoms of a divalent organic radical which carbon atoms are in turn connected to adjacent atoms, at least one of which is hydrogen, by single valence bonds. The preferred dihydroxy compounds are those aliphatic and alicyclic dihydroxy compounds which are known to be useful in the preparation of high-molecular weight, linear polyesters. Such dihydroxy compounds may be represented by the formulas:

HOROH
HO(R¹O)$_n$H
HOR²OH
HO(R¹)Ar(R¹)OH
HO(R¹O)Ar(OR¹)OH
HO(R¹)R²(R¹)OH
HO(R¹O)R²(OR¹)OH wherein R is a divalent straight- or branched-chain saturated aliphatic hydrocarbon radical containing 2 to 12 carbon atoms, R¹ is a divalent straight- or branched-chain saturated aliphatic hydrocarbon radical containing 2 to 4 carbon atoms, R² is a divalent alicyclic hydrocarbon radical containing 4 to 10 carbon atoms, Ar is a mono- or di-nuclear aromatic hydrocarbon radical containing 6 to 12 nuclear carbon atoms, and $n$ is an integer from 2 to 5.

Typical examples are ethylene glycol, 1,3-propanediol,
1,4-butanediol,
1,2-propanediol,
1,6-hexanediol,
1,12-dodecanediol,
2,2-dimethyl-1,3-propanediol,
diethylene glycol,
1,4-cyclohexanediol,
2,6-norbornanediol,
1,4-tetrahydronaphthalenediol,
p-xylene glycol,
2,2'-p-phenylenedioxydiethanol,
1,4-cyclohexanedimethanol, and
2,2,4,4-tetramethyl-1,3-cyclobutanediol.

Hydroxy acids which may be used in the process of our invention include those in which the carboxy group may be attached to an aromatic ring structure or like the hydroxy group may be separated from the aromatic ring by an alkylene group, a cycloalkylene group, or an alkyleneoxy group. The aromatic nucleus may be derived from benzene or a condensed polycyclic aromatic system such as naphthalene, phenanthrene, etc. The aromatic ring may contain substituents such as lower alkyl groups, aryl groups, or halogen. The carboxy and hydroxy groups of the hydroxy acid may also be separated by an alkylene group, a cycloalkylene group, or an alkyleneoxy group.

Suitable representative hydroxy acids are glycolic acid, hydroxypivalic acid, 6-hydroxyhexanoic acid, 4-hydroxymethylcyclohexanecarboxylic acid, and 4-hydroxymethylbenzoic acid.

In preparing poly(ester-amides) in accordance with our invention an inert atmosphere should be employed. Agitation is also employed in order to facilitate removal of water from the viscous melt. Vacuum is likewise advantageously used in the later stages of the reaction.

In one embodiment of the invention the reactants containing 0.005 percent to 2.0 percent, based on the weight of the reactants, of the tin catalyst are heated in a suitable vessel at a temperature of 200–300° C. for 30 to 90 minutes in order to prepare a low molecular weight prepolymer. This prepolymer is then built up to a high molecular weight by stirring the melt in vacuum for a period of from 30 minutes to three hours at a temperature of 200°–350° C. Alternatively, the prepolymer may be granulated to a particle size of 0.03 inch or smaller and heated in a vacuum or in an inert atmosphere at a temperature somewhat below its melting point for one hour or longer.

If desired, when the melt polymerization process is employed, an inert diluent can be used as the heat transfer medium to reduce the melt viscosity of the polymerizing mixture. Typical examples of such inert diluents are terphenyl, chlorinated diphenyl, alkylated diphenyl ether, and chlorinated or alkylated naphthalenes.

In general the poly(ester-amides) prepared in accordance with the invention are characterized by melting points of about 150° C. or higher.

In the following examples and description, we have set forth several of the preferred embodiments of our invention; but they are included merely for purposes of illustration and not as a limitation thereof.

EXAMPLE I

A reaction vessel fitted with stirrer, take off for volatile materials, provision for maintaining a nitrogen atmosphere, and provision for applying reduced pressure was loaded with 10.1 g. (0.05 mole) of sebacic acid, 4.95 g. (0.025 mole) of 4,4'-methylenedianiline, 3.6 g. (0.025 mole) of 1,4-cyclohexanedimethanol and 0.01 g. of dibutyl tin oxide catalyst. The reaction mixture was heated initially at 200° C. with stirring while maintaining a nitrogen blanket over the melt. As soon as the reaction mixture melted, the temperature of the heating bath was raised to 270° C. Stirring was continued under the nitrogen blanket at 270° C. for 20 minutes. The pressure in the reaction vessel was then reduced to 0.4 mm. Hg. The polymer melt was stirred under vacuum at 270° C. for 1 hour. The melt viscosity of the polymer was quite high. The polymer melt wrapped around the stirrer blade event at low stirrer speeds. The color of the melt was light amber. The inherent viscosity of the polymer, as measured in 60/40 phenol/tetrachloroethane at a concentration of 0.23 g. per 100 ml., was 0.73. This poly(ester-amide) melted at 230–240° C.

EXAMPLE II

Example I was repeated exactly as to reactants and heating program except that no dibutyl tin oxide was added. After one hour under vacuum at 270° C., the melt viscosity of the polymer was still low. The inherent viscosity of the polymer was only 0.37. The use of the tin catalyst obviously is a considerable improvement in the process of making poly(ester-amides) from aromatic diamines. A polymer which has too low a molecular weight to be useful in the production of film, fiber, and molding plastic is converted into a useful product by using a tin catalyst to obtain high-molecular weight polymer.

EXAMPLE III

Example I was repeated exactly as to reactants and heating program except that 0.005 g. of titanium tetraisopropoxide was added in place of the dibutyl tin oxide. The inherent viscosiety of the polymer was 0.44. Titanium is a very good esterification and ester interchange catalyst but does not produce a high-viscosity poly(ester-amide) in this polymerization. This shows that the tin catalysts are very specific for producing poly(ester-amides) from aromatic amino compounds.

EXAMPLE IV

A polymer was prepared from 8.7 g. (0.05 mole) of suberic acid, 5.94 g. (0.03 mole) of 4,4'-methylenedianiline, 2.88 g. (0.02 mole) of 1,4-cyclohexanedimethanol, and 0.01 g. of dibutyl tin oxide as described in Example I. The resulting poly(ester-amide) melted at 260–265° C., as determined in a capillary tube sealed off under nitrogen. It has an inherent viscosity of 0.76.

EXAMPLE V

Using the procedure described in Example I, a polymer was prepared from 7.3 g. (0.05 mole) of adipic acid, 4.95 g. (0.025 mole) of 4,4'-methylenedianiline, 3.6 g. (0.025 mole) of 1,4-cyclohexanedimethanol and 0.02 g. of dibutyl tin dilaurate. The polymer melted at 259–265° C. and had an inherent viscosity of 0.94.

EXAMPLE VI

In Example I, 4.32 g. (0.03 mole) of 1,4-cyclohexanedimethanol was used. The other reactants and conditions of polymerization were not changed. An inherent viscosity of 0.73 was obtained. The diol used constituted an excess of 20 percent over the equivalent amount. This shows that equivalent amounts of reactants are not necessary to obtain a high-molecular weight polymer using tin catalysts in the polymerization process.

EXAMPLE VII

Poly(ester-amides) having the compositions and properties listed in Table 1 were prepared using the tin catalyst shown and employing essentially the procedure described in Example I. Modifications in the heating schedule were necessary in some instances to allow for melt polymerization of higher-melting compositions.

EXAMPLE XXI

A poly(ester-amide) is prepared from a molar ratio of 3/1/1 3-amino-4-methylbenzoic acid/sebacic acid/2,2-dimethyl-1,3-propanediol using 0.06 percent, based on the reactants, of dibutyl tin diacetate as catalyst. The polymer is useful in the production of fiber, film, and molding plastic.

EXAMPLE XXII

A poly(ester-amide) is prepared from a molar ratio of 1/0.95/0.05 terephthalic acid/1,4-cyclohexanedimethanol/p-phenylenediamine using 0.1 percent, based on the reactants, of dibutyl tin sulfide as catalyst. The terephthalic acid is esterified first with the diol until a clear solution is obtained. The p-phenylenediamine is then added and the reaction mixture heated under vacuum at 290° C. A high-melting polymer is obtained which is less crystalline than the polyester homopolymer and is suitable for the production of film and molded objects.

As shown by the above examples and description, the efficacy of our process for obtaining high molecular weight, long chain, linear poly(ester-amides) of high inherent viscosity, high melting points, good color and other physical properties which particularly fit them for use in the production of fibers, films, sheets and molded

| | Polymer intermediates | | | | | Polymer | |
| --- | --- | --- | --- | --- | --- | --- | --- |
| Example | Dicarboxylic acid constituent(s) | Aromatic diamine constituent(s) | Diol constituent | Molar ratio, diamine/diol | Catalyst | Melting or softening temp., °C. | I.V. |
| VII | Adipic | 4,4'-ethylene dianiline | 1,4-butanediol | 3/7 | $Bu_2\phi_2Sn$ | 242 | 0.84 |
| VIII | Isophthalic | m-Phenylenediamine | p-Xylylene glycol | 3/7 | $Bu_2Sn(OAc)_2$ | 274 | 0.77 |
| IX | Terephthalic | 4,4'-oxydianiline | Ethylene glycol | 1/4 | $Bu_2SnO$ | 289 | 0.71 |
| X | do | 2,4'-tolylenediamine | 2,2'-dimethyl-1,3-propanediol | 2/3 | (¹) | 257 | 0.65 |
| XI | do | 4,4'-methylenedianiline | 1,4-cyclohexane-dimethanol | 1.5/8.5 | $Bu_2SnO$ | 293 | 0.86 |
| XII | Hexahydroisophthalic | 3,3'-dimethyl-4,4'-methylenedianiline | 1,6-hexanediol | 4/1 | (²) | 280 | 0.94 |
| XIII | Terephthalic | do | 1,4-cyclohexane-dimethanol | 2/3 | $Bu_2SnO$ | 265 | 0.83 |
| XIV | 60/40 isophthalic/terephthalic | m-Phenylenediamine | 1,4-butanediol | 1/1 | $Bu_2SnO$ | 248 | 0.80 |
| XV | Isophthalic | 30/20-m-phenylenediamine/p-phenylenediamine | 1,4-cyclohexanedimethanol | 1/1 | $Bu_2SnO$ | 253 | 0.78 |
| XVI | do | 4,4'-isopropylidenedianiline | do | 2/3 | $Bu_2SnO$ | 261 | 0.83 |

¹ Dibutyl tin dilaurate.
² Bis(tributyl tin) oxide.

EXAMPLE XVII

A poly(ester-amide) was prepared from 4-aminobenzyl alcohol and sebacic acid using dibutyl tin oxide as catalyst. The polymer melted at 272–280° C. and had an inherent viscosity of 0.94.

EXAMPLE XVIII

A poly(ester-amide) was prepared from a molar ratio of 3/2-3-hydroxymethyl cyclohexane carboxylic acid/3-aminophenyl acetic acid using tin octanoate as catalyst. The polymer melted at 278–286° C. and had an inherent viscosity of 0.82.

The poly(ester-amides) described in the preceding examples are useful in the production of fiber, film, sheeting, molding plastic and other shaped objects.

EXAMPLE XIX

A poly(ester-amide) is prepared from a molar ratio of 3/2/1/1 6-hydroxyhexanoic acid/4-aminophenoxyacetic acid/1,12-dodecanedicarboxylic acid/4,4'-methylenedianiline by essentially the procedure described in Example I and using tetrabutyl tin as catalyst. A high-melting, high-molecular weight polymer is obtained which is useful in the production of fiber, film, sheeting and molding plastic.

EXAMPLE XX

A poly(ester-amide) is prepared from a molar ratio of 1/2/2 4-hydroxymethylbenzoic acid/suberic acid/3,3'-dimethyl-4,4'-methylenedianiline using 0.1 percent, based on the reactants, of dibutyl tin oxide as catalyst. The resulting polymer softens at about 212° C. and is useful as a molding plastic.

and other shaped plastic products and at relatively short reaction times in the equipment customarily employed for commercial polyeser or polyamide production, is dependent upon the use in the above described reactions of the tin catalysts herein described. As indicated, we have found that these tin catalysts greatly increase the reaction rate between aromatic amino compounds, carboxylic acid compounds and aliphatic and alicyclic hydroxy compounds and that by thier use one is not only enabled to carry out the polymer forming process at relatively high reaction rates but also to obtain a polymer product which is characterized by its good color, high glass transition temperature, high melting point, high modulus of elasticity, excellent stability in air at temperatures of 150° C. or higher, high inherent viscosity and a linear molecular structure and other properties which enable these novel polymers to be readily fabricated into a wide variety of products of excellent quality by the usual processes of spinning, film and sheet forming, molding and the like.

It will thus be seen that we have not only provided a novel and highly efficient process for the production of high molecular weight long chain poly(ester-amides) of the type herein described but have also provided a novel composition of matter, that is, poly(ester-amides) having such chemical structure and physical properties as fit them for many valuable industrial applications such as the manufacture of fibers, films, sheets and molded and other shaped plastic products.

Although the invention has been described in considerable detail with particular reference to certain preferred embodiments thereof, variations and modifications can be effected within the spirit and scope of the invention as

We claim:
1. An improved process for preparing a fiber or film forming linear poly(ester-amide), which process comprises heating, at an elevated temperature within the range of 200 to 350° C. and in an inert atmosphere, including a vacuum, (a) carboxylic acid groups and (b) aromatic primary amino groups and aliphatic or alicyclic hydroxyl groups as the sole reactive groups, wherein:

the amount of carboxylic acid groups is substantially equivalent to the sum of the aromatic primary amino groups and hydroxyl groups, and said carboxylic acid groups being present as carboxylic acid groups of difunctional carboxylic acid compounds selected from the group consisting of an aromatic amino acid, an hydroxy carboxylic acid and a dicarboxylic acid selected from the group consisting of an aliphatic dicarboxylic acid which contains at least 4 carbon atoms between the carboxyl groups, an aromatic dicarboxylic acid which contains at least 3 carbon atoms between the carboxyl groups and an alicyclic dicarboxylic acid which contains at least 3 carbon atoms between the carboxy groups, and said aromatic primary amino groups constituting from 5 to 80 mole percent of the total amino and hydroxyl reactive groups and being present as amino groups of difunctional amino compounds selected from the group consisting of an aromatic diamine which contains at least 3 carbon atoms between the amino groups, an aromatic amino alcohol and an aromatic amino acid, and said hydroxy groups being present as hydroxy groups selected from the group consisting of aliphatic hydroxy groups of difunctional hydroxy compounds and alicyclic hydroxy groups of difunctional compounds said difunctional compounds being selected from the group consisting of an aromatic amino alcohol, an hydroxy carboxylic acid, an aliphatic diol and an alicyclic diol the amino groups of said aromatic diamines, aromatic amino alcohols and aromatic amino acids being attached directly to an aromatic nucleus, and in said hydroxy compounds the hydroxy group is separated from the other functional group, that is, hydroxy, carboxy, and amino, by at least two carbon amino acid, and said hydroxy group is attached directly to a divalent organic radical wherein the carbon atom attached to hydroxy is in turn attached by single valence bonds to adjacent atoms, at least one of which is hydrogen, in the presence of from 0.005 to 2.0 percent, based on the weight of the reaction mixture, of a tin compound catalyst selected from the group consisting of (1) organo-metallic tin compounds containing at least one carbon to tin bond the other valences of the tin being satisfied by at least one bond attached to a member selected from the group consisting of carbon atoms, oxygen atoms, sulfur atoms and halogen atoms and (2) tin compounds in which all valences of the tin are satisfied by —O— bonds, wherein the —O— linkage is part of a member selected from the group consisting of carboxyl and alkoxide groups.

2. An improved process as defined by claim 1 wherein said carboxylic acid groups are present as carboxylic acid groups of difunctional dicarboxylic acids.

3. An improved process as defined by claim 1 wherein said amino groups are present as amino groups of difunctional diamines.

4. An improved process as defined by claim 1 wherein said hydroxy groups are present as hydroxy groups of difunctional diols.

5. An improved process as defined by claim 1 wherein the tin compound is a di- or tetra-valent organo-metallic tin compound in which the several valences are satisfied by substituents selected from the group consisting of alkyl groups and aryl groups.

6. An improved process as defined by claim 2 wherein the tin compound is a di- or tetra-valent organo-metallic tin compound in which the several valences are satisfied by substituents selected from the group consisting of alkyl groups and aryl groups.

7. An improved process as defined by claim 3 wherein the tin compound is a di- or tetra-valent organo-metallic tin compound in which the several valences are satisfied by substituents selected from the group consisting of alkyl groups and aryl groups.

8. An improved process as defined by claim 4 wherein the tin compound is a di- or tetra-valent organo-metallic tin compound in which the several valences are satisfied by substituents selected from the group consisting of alkyl groups and aryl groups.

9. An improved process as defined by claim 1 wherein the organo-metallic tin compound contains at least one carboxylate salt bond.

10. An improved process as defined by claim 1 wherein the tin compound is dibutyl tin oxide.

11. An improved process as defined by claim 1 wherein the tin compound is dibutyl tin dilaurate.

12. An improved process as defined by claim 1 wherein the tin compound is tetrabutyl tin.

13. An improved process as defined by claim 1 wherein the tin compound is dibutyl tin sulfide.

14. An improved process as defined by claim 1 wherein the tin compound is dibutyl tin dichloride.

15. An improved process as defined by claim 1 wherein the tin compound is tin tetrabutoxide.

References Cited

UNITED STATES PATENTS

| | | | |
|---|---|---|---|
| 2,547,113 | 4/1951 | Drewitt et al. | 260—47(CZ) |
| 2,740,764 | 4/1956 | Nischk et al. | 260—75X |
| 2,831,831 | 4/1958 | Caldwell et al. | 260—75(N) |
| 2,848,439 | 8/1958 | Reynolds et al. | 260—75(N) |
| 2,891,929 | 6/1959 | Caldwell et al. | 260—75(N) |
| 2,899,408 | 8/1959 | Caldwell et al. | 260—75(N) |
| 2,901,466 | 8/1959 | Kibler et al. | 260—75 |
| 3,313,777 | 4/1967 | Elam et al. | 260—75(N) |

FOREIGN PATENTS

| | | | |
|---|---|---|---|
| 1,278,284 | 10/1961 | France | 260—75 |

WILLIAM H. SHORT, Primary Examiner

LOUISE P. QUAST, Assistant Examiner

U.S. Cl. X.R.

260—47, 49, 76, 77, 78

PO-1050
(5/69)

UNITED STATES PATENT OFFICE
CERTIFICATE OF CORRECTION

Patent No. 3,546,178     Dated December 8, 1970

Inventor(s) John R. Caldwell and Russell Gilkey

It is certified that error appears in the above-identified patent and that said Letters Patent are hereby corrected as shown below:

Column 11, line 47, "amino acid" should read ---atoms---.

SIGNED AND
SEALED
MAY 9 1971

(SEAL)
Attest:

Edward M. Fletcher, Jr.
Attesting Officer

WILLIAM E. SCHUYLER, JR.
Commissioner of Patents